United States Patent [19]
Nishi et al.

[11] Patent Number: 6,165,575
[45] Date of Patent: Dec. 26, 2000

[54] ADHESIVE FLUORORESIN AND LAMINATE EMPLOYING IT

[75] Inventors: Eiichi Nishi; Masayuki Saito; Junko Asakura, all of Kanagawa, Japan

[73] Assignee: Asahi Glass Company Ltd., Tokyo, Japan

[21] Appl. No.: 09/311,054

[22] Filed: May 14, 1999

[30] Foreign Application Priority Data

May 15, 1998 [JP] Japan .................................. 10-133844

[51] Int. Cl.$^7$ .......................... B32B 27/08; B32B 27/28; B32B 27/34
[52] U.S. Cl. ....................... 428/36.9; 428/36.6; 428/36.7; 428/421; 428/476.3; 428/476.9; 526/250; 526/255; 156/333
[58] Field of Search .................................. 428/36.6, 36.7, 428/36.9, 421, 476.3, 476.9, 422; 526/250, 255; 156/333

[56] References Cited

PUBLICATIONS

Chemical Abstracts, vol. 91, No. 8, Aug. 20, 1979, AN 58369, JP 54–045386, Apr. 10, 1979.
Chemical Abstracts, vol. 109, No. 22, Nov. 28, 1988, AN 191204.

*Primary Examiner*—Vivian Chen
*Attorney, Agent, or Firm*—Oblon, Spivak, McClelland, Maier & Neustadt, P.C.

[57] ABSTRACT

An adhesive fluororesin (A) comprising an ethylene-tetrafluoroethylene copolymer having at least one characteristic selected from the group consisting of a melt flow characteristic which is a melt flow rate of at least 40 and an infrared absorption characteristic which is a distinct absorption peak within a wavenumber range of from 1,720 to 1,800 cm$^{-1}$ in its infrared absorption spectrum.

15 Claims, 3 Drawing Sheets

ADHESIVE FLUORORESIN AND LAMINATE EMPLOYING IT

The present invention relates to a laminate comprising a layer of a fluororesin made of a specific ethylene-tetrafluoroethylene copolymer, particularly a laminate excellent in the adhesive strength between that layer and another layer.

A fluororesin made of an ethylene-tetrafluoroethylene copolymer (ETFE) is excellent in chemical resistance, weather resistance, surface properties, etc., and is used in a wide range of fields. For example, a film of ETFE is used as a surface covering material for a substrate made of an inorganic material such as a metal or glass or an organic material such as a synthetic resin. A thermoplastic resin laminate is produced usually by directly overlaying and bonding thermoplastic resin layers one on another by e.g. coextrusion molding or heat fusion. However, in a case of a laminate made of resins having substantially different properties, the interlaminar bond strength of such a laminate has been inadequate. Particularly in a case of a multilayer film or a multilayer tube prepared by laminating ETFE and other thermoplastic resins by a coextrusion molding method or a heat fusion method, the interlaminar bond strength has not been adequate.

It is an object of the present invention to provide an adhesive fluororesin and a laminate wherein such a fluororesin layer and a thermoplastic resin layer are directly firmly bonded to each other.

The present invention provides an adhesive fluororesin (A) comprising an ethylene-tetrafluoroethylene copolymer (hereinafter referred to as ETFE (A)) having at least one characteristic among a melt flow characteristic that its melt flow rate is at least 40 and an infrared absorption characteristic that it has a distinct absorption peak within a wavenumber range of from 1,720 to 1,800 $cm^{-1}$ in its infrared absorption spectrum.

Further, the present invention provides a laminate comprising a layer of this ETFE (A) and a layer of a thermoplastic resin (B) other than ETFE (A), said layers being in contact directly with each other.

The present invention also provides an adhesive fluororesin (A) comprising an ethylene-tetrafluoroethylene copolymer having a melt flow characteristic that its melt flow rate is at least 40 and an infrared absorption characteristic that it has a distinct absorption peak within a wavenumber range of from 1,720 to 1,800 $cm^{-1}$ in its infrared absorption spectrum (one type of ETFE (A)).

Further, the present invention provides a laminate comprising a layer of this ETFE (A) and a layer of a thermoplastic resin (B) other than ETFE (A), said layers being in contact directly with each other.

In the present invention, the melt flow rate of ETFE (A) is a value measured by the method stipulated in ASTM D-3159. Namely, when ETFE (A) is used alone, the melt flow rate corresponds to its amount (g/10 min) which passes through a nozzle having a diameter of 2 mm and a length of 10 mm for 10 minutes under a load of 5 kg at a temperature of 297° C. Further, in the present invention, "it has a distinct absorption peak within a wavenumber range of from 1,720 to 1,800 $cm^{-1}$ in its infrared absorption spectrum" means that when a sample having a thickness of 100 μm, made of the resin alone, is used for measurement of the infrared absorption spectrum, the absorption peak with an absorbance of at least 0.002 is present within a wavenumber range of from 1,720 to 1,800 $cm^{-1}$.

The melt flow rate (hereinafter referred to as MFR) is an index of the melt flow characteristic and also an index of the molecular weight. Usually, MFR of ETFE obtainable by polymerization is less than 40 (e.g. MFR of AFLON LF-740AP (sold by Asahi Glass Company Ltd.) which is commercially available ETFE, is 38). ETFE (A) having a MFR of at least 40 provides a high bond strength even to a material which used to have no adequate bond strength or used to be impossible to bond. More preferably, MFR of ETFE (A) is at least 50, particularly preferably at least 60. The upper limit of MFR of ETFE (A) is not particularly limited and may substantially be infinite (i.e. a liquid at a temperature of 297° C.). However, it is required to be a solid having a bond strength at a practical temperature for use of the laminate of the present invention.

Further, ETFE (A) having the infrared absorption characteristic of the present invention exhibits a high bond strength to a material which used to have no adequate bond strength or used to be impossible to bond. Especially, ETFE (A) having a distinct absorption peak at a wavenumber of 1,759 $cm^{-1}$ or 1,788 $cm^{-1}$, is preferred, since it remarkably increases the bond strength with other materials.

Especially, ETFE (A) which has a MFR of at least 40 and the infrared absorption characteristic of the invention, is particularly preferred, since it exhibits a practically sufficiently high bond strength even to a material which used to have no adequate bond strength or used to be impossible to bond.

ETFE is a copolymer obtained by copolymerizing tetrafluoroethylene (hereinafter referred to as TFE) and ethylene, or a copolymer obtained by copolymerizing these monomers with at least one other monomer copolymerizable with these monomers. A copolymer is preferred wherein the molar ratio of polymer units derived from TFE/polymer units derived from ethylene/polymer units derived from other monomers is 70 to 35/25 to 60/0 to 40. Particularly preferred is a copolymer wherein the molar ratio is 65 to 50/30 to 45/0 to 10.

Said other monomers copolymerizable with TFE and ethylene, may, for example, be α-olefins such as propylene and butene, fluoroolefins having hydrogen atoms directly bonded to a polymerizable unsaturated group, such as vinylidene fluoride and (perfluorobutyl)ethylene, vinyl ethers such as an alkyl vinyl ether and a (fluoroalkyl) vinyl ether, (meth)acrylates such as a (fluoroalkyl) methacrylate and a (fluoroalkyl) acrylate, and perfluoromonomers having no hydrogen atom bonded to a polymerizable unsaturated group, such as hexafluoropropylene and perfluoro (alkyl vinyl ether).

ETFE (A) having a MFR of at least 40 can be produced by the following methods.

A first method is a method of producing ETFE (A) having a MFR of at least 40 directly by polymerization. For example, in a case where it is produced by suspension polymerization, it is possible to obtain ETFE (A) having a MFR of at least 40 by adding a chain transfer agent to an aqueous medium using a hydrocarbon type peroxide as an initiator, and adjusting the type or the amount of the chain transfer agent to adjust the molecular weight of the resulting polymer (namely to obtain a polymer having a lower molecular weight than usual ETFE). For the production of ETFE (A), various conventional polymerization methods such as bulk polymerization, suspension polymerization, emulsion polymerization and solution polymerization, may be employed. ETFE (A) obtained by the above polymerization does not usually have the infrared absorption characteristic of the present invention.

A second method is a method to bring MFR to at least 40 by creating breakage of the molecular chains of ETFE obtained by a conventional polymerization method (ETFE having a MFR of less than 40) to lower the molecular weight. For example, ETFE may be subjected to heat treatment or irradiation with high energy rays such as radio active rays, ultraviolet rays or low temperature plasma to obtain such a product. By carrying out such treatment in the presence of an oxygen in the treatment atmosphere, it is possible to obtain ETFE (A) having a MFR of at least 40 effectively. Treatment in an atmosphere having a higher oxygen concentration, is effective. Usually, the treatment is carried out in an air atmosphere. In the case of heat treatment, the desired ETFE (A) can be obtained by heating ETFE, for example, in air at a temperature of at least 300° C. for at least 3 minutes, preferably at a temperature of from 330 to 400° C. for from 5 to 30 minutes. Usual ETFE has a melting point of about 300° C. Accordingly, this treatment is carried out usually at a temperature of at least the melting point of non-treated ETFE.

A third method is a method to bring MFR to at least 40 by creating breakage of the molecular chains of ETFE by free radicals to lower the molecular weight. For example, ETFE having a MFR of less than 40 and a peroxide are melt-kneaded to break the molecular chains of ETFE by free radicals generated from the peroxide to lower the molecular weight, thereby to obtain ETFE (A) having a MFR of at least 40. The treating temperature is at least a temperature at which the peroxide will decompose to form free radicals, and it is usually at least 120° C. For the melt kneading, a temperature of at least the melting point of ETFE is employed. The temperature for this treatment is preferably from the melting point of ETFE to 350° C.

As the peroxide, ketone peroxides, dialkyl peroxides such as 2,5-dimethyl-2,5-bis(t-butylperoxy)hexane, diacyl peroxides such as benzoyl peroxide, peroxydicarbonates such as diisopropyl peroxydicarbonate, alkyl peresters such as t-butylperoxy isobutyrate, and hydroxyperoxides such as t-butylhydroxyperoxide, may, for example, be used.

As starting material ETFE to be used in these second and third methods, ETFE having a MFR of less than 40, may be employed, but the material is not limited thereto. For example, ETFE having a MFR of at least 40, such as ETFE (A) obtained by the first method may be subjected to the second or third method to further increase MFR.

The infrared absorption characteristic of ETFE (A) in the present invention is considered to be a characteristic attributable to the presence of functional groups in ETFE (A), which correspond to the distinct absorption peak within a wavenumber range of from 1,720 to 1,800 cm$^{-1}$ in its infrared absorption spectrum. Such functional groups are not present in ETFE obtained by a usual polymerization method. Such functional groups are considered to be functional groups which are formed by the reaction with oxygen atoms, of double bonds formed anew in the molecular chains by a reaction to withdraw hydrogen atoms or fluorine atoms from ETFE. Accordingly, for example, among the above-mentioned methods for obtaining ETFE (A) having a MFR of at least 40, the second or third method may be employed to produce ETFE (A) having this infrared absorption characteristic. Namely, by such a method, double bonds may be introduced into the molecular chains of ETFE, and at the same time, oxygen atoms are reacted to such double bonds to form ETFE having the above functional groups.

When ETFE (A) having the infrared absorption characteristic is produced by the second method, it is particularly preferred to carry out the heat treatment or the high energy ray irradiation in an oxygen-containing atmosphere. Particularly preferred is a method of heating ETFE in air at a temperature of at least 300° C. for at least 3 minutes, preferably at a temperature of from 330 to 400° C. for from 5 to 30 minutes. When ETFE (A) having the infrared absorption characteristic is produced by the third method, it is preferred to employ a method of melting and kneading ETFE and the peroxide. Particularly preferred is a method of melting and kneading the starting material ETFE and the peroxide at a temperature of from the melting point of ETFE to 350° C. It is considered that by these methods, the oxygen in the atmosphere or free radicals derived from the peroxide (or both the oxygen in the atmosphere and the free radicals) will contribute to formation of the above functional groups. The starting material ETFE for these methods, may be ETFE having a MFR of less than 40 or ETFE having a MFR of at least 40.

ETFE (A) having a MFR of at least 40 and the infrared absorption characteristic, can be produced by the above-mentioned second or third method, as described above. Such a method is not only a method capable of producing ETFE (A) having a MFR of at least 40, but also a method capable of producing ETFE (A) having the infrared absorption characteristic. Particularly preferred is a method for carrying out heat treatment of ETFE in air at a temperature of at least 300° C. for at least 3 minutes, preferably at a temperature of from 330 to 400° C. for from 5 to 30 minutes, or a method for melting and kneading ETFE and the peroxide at a temperature of from the melting point of ETFE to 350° C.

As the thermoplastic resin (B) other than ETFE (A), various thermoplastic resins may be used. Further, it may be a thermoplastic resin having flexibility, so-called a thermoplastic elastomer. Or, it may be a mixture of different thermoplastic resins. As such a thermoplastic resin, specifically, the following thermoplastic resins may, for example, be mentioned:

A fluororesin other than ETFE (A), a polyolefin resin, a polyamide resin, a polyester resin, a polystyrene resin, an ABS resin, a BS resin, a MBS resin, an EVA resin, an acrylic resin, a polyurethane resin, a polyimide resin, a polyphenylenesulfide resin, a vinyl chloride resin, a polyolefin type thermoplastic elastomer, a polyamide type thermoplastic elastomer, a polyester type thermoplastic elastomer, a polybutadiene type thermoplastic elastomer, a polystyrene type thermoplastic elastomer, a polyvinyl chloride thermoplastic elastomer and a fluorine-containing thermoplastic elastomer.

More specifically, the following thermoplastic resins may, for example, be mentioned; ETFE other than ETFE (A), a fluororesin such as PFA or FEP, a polyolefin resin such as polyethylene or polypropylene, a polyamide resin such as polyamide 6, polyamide 11 or polyamide 12, a polyester resin such as polyethylene terephthalate or polybutylene terephthalate, and an acrylic resin such as polymethyl methacrylate.

Preferred as the thermoplastic resin (B) is a polyamide type thermoplastic resin such as a polyamide resin or a polyamide type thermoplastic elastomer. Particularly preferred is a polyamide resin such as polyamide 6, polyamide 11 or polyamide 12. Such a polyamide type thermoplastic resin has a relatively small penetrability of a fuel oil.

To the respective resins constituting the layers of the laminate of the present invention, various additives may be incorporated, as the case requires. Such additives are preferably not to impair the required performance of such layers. For example, so long as the predetermined adhesive properties can be maintained, various additives may be incorporated to ETFE (A). Such additives include, for example, a filler, reinforcing fibers, a pigment, a plasticizer, a tackifier, a silane coupling agent and a titanate type coupling agent.

Further, so long as the predetermined adhesive property can be maintained, other resins may be incorporated to ETFE (A), and for example, usual ETFE may be incorporated.

The laminate of the present invention is a laminate wherein a layer of ETFE (A) (hereinafter referred to as layer (A)) and a layer of a thermoplastic resin (B) (hereinafter referred to as layer (B)) are in contact directly with each other. The laminate of the present invention is not limited to the double layer structure comprising layer (A) and layer (B). So long as it contains a double layer structure wherein layer (A) and layer (B) are in contact directly with each other (hereinafter referred to as layers (A)/(B)), it may be a laminate having a structure of three or more layers. On the layer (A) side of layers (A)/(B), at least one layer made of a resin which may be the same as or different from the resin of layer (A), may be formed. ETFE (A) of layer (A) may be bonded to not only the same resin but also to a different resin such as the thermoplastic resin (B) with a high bond strength as mentioned above. Similarly, on the layer (B) side of layers (A)/(B), at least one layer made of a resin which is the same as or different from the resin of layer (B) may be formed. Further, in some cases, the layer which is in contact with layer (A) or layer (B) may be made of a material other than a resin. A preferred other layer is a layer of a thermoplastic resin.

When a third layer is present on the layer (A) side of layers (A)/(B), such a layer will hereinafter be referred to as layer (C). The material for layer (C) which is in direct contact with layer (A) is preferably a thermoplastic resin similar to the thermoplastic resin (B). However, the material is not limited thereto and may be made of a resin other than a thermoplastic resin or a material other than a resin. A preferred material for layer (C) is a thermoplastic fluororesin, and particularly preferred is ETFE other than ETFE (A). Further, it is preferred that layer (C) is made of the same resin (i.e. ETFE (A)) as layer (A) or it is a layer of a resin having different physical properties (for example, layer (A) is a layer composed solely of ETFE (A), and layer (C) is a layer comprising ETFE (A) and the after-mentioned conductive additive and having electrical conductivity). To the thermoplastic resin of layer (C), the above-mentioned various additives may be incorporated.

The laminate of the present invention is useful particularly as a tube for transporting a fuel or a container for storage of a fuel. ETFE including ETFE (A) has high chemical resistance against a liquid fuel such as gasoline and further has a characteristic such that the penetrability of a liquid fuel is particularly small as compared with other thermoplastic fluororesins. Accordingly, in a case where the layer contacting a liquid fuel is a layer of ETFE (A) or ETFE, the interlaminar bond strength of the laminate is less likely to be affected by penetration of a liquid fuel, and the initial high bond strength can be maintained. Accordingly, the layer made of a resin such as ETFE (A) or ETFE is preferably a surface layer which is in contact directly with the liquid fuel, or a layer close to the surface. In such use, if ETFE is used alone, the physical strength or the like tends to be inadequate, and such a problem can be solved by the laminate of the present invention wherein a layer (B) supplementing such a physical property is incorporated.

In the above use, a part of the layer of the laminate, particularly the surface layer which is in contact with a fuel, is required to be a layer having electrical conductivity and having an antistatic function (hereinafter referred to as a conductive layer) in many cases. In order to provide the antistatic function, the volume resistivity of the material for the conductive layer is preferably within a range of from $1\times10^0$ to $1\times10^9$ $\Omega$cm, particularly from $1\times10^2$ to $1\times10^9$ $\Omega$cm. In order to make a resin layer to be a conductive layer, it is preferably a resin layer containing a conductive additive. In order to bring the volume resistivity of the resin containing the conductive additive within this range, it is preferred that the conductive additive is contained in an amount of from 1 to 30 parts by weight, particularly from 5 to 20 parts by weight, per 100 parts by weight of the resin, although it may depend upon the conductive additive or the type of the resin.

The conductive additive may, for example, be a powder or fibers of a metal or carbon, a powder of a conductive compound such as zinc oxide, or a non-conductive powder having the surface treated for electrical conductivity by e.g. metallizing. As the powder or fibers of a metal or carbon, a powder of a metal such as copper, nickel or silver, fibers of a metal such as iron or stainless steel, carbon black, or carbon fibers, may, for example, be mentioned. As the non-conductive powder treated for electrical conductivity, a metallized inorganic compound powder having the surface of glass beads or titanium oxide metallized by metal sputtering or electroless plating, may, for example, be mentioned.

As mentioned above, the laminate of the present invention having a conductive layer is preferably such that the surface layer which will be in contact with a liquid fuel or a layer close thereto, is made of a resin such as ETFE and is a conductive layer. Accordingly, in the case of a laminate composed of two layers of layers (A)/(B), it is preferred that layer (A) is the surface layer which will be in contact with a liquid fuel and is a conductive layer. In the case of a laminate wherein layer (C) is present on the layer (A) side of layers (A)/(B), and layer (C) is a surface layer which will be in contact with a liquid fuel, it is preferred that layer (C) is a conductive layer. Particularly preferably, layer (C) is made of a fluororesin such as ETFE (A) or ETFE and is a conductive layer. Most preferably, layer (C) is made of ETFE and is a conductive layer. In these cases, the material for layer (B) is preferably a polyamide type thermoplastic resin as mentioned above, from the viewpoint of e.g. the required performance of physical strength.

Further, by means of ETFE (A) of the present invention, a film or the like made of a fluororesin other than ETFE (A), may, for example, be bonded to cover the surface of a substrate made of an organic material such as a metal or glass or an organic material such as a synthetic resin.

The thickness of each layer of the laminate of the present invention is not particularly limited, but is preferably within a range of from 0.05 to 2.0 mm. In a case where layer (C) is present on the layer (A) side of layers (A)/(B), particularly in a case where the material of layer (C) is ETFE other than ETFE (A), it is preferred that the thickness of layer (A) is thicker than the thickness of layer (C) in order to improve the bond strength between layer (A) and layer (C).

The shape of the laminate of the present invention is not particularly limited, but is preferably a film-like laminate or a tubular laminate. In the case of a tubular laminate, the thickness of each layer is preferably within the above range, and the outer diameter of the tube is preferably from 5 to 30 mm, and the inner diameter is preferably from 3 to 25 mm. As the method for producing the laminate of the present invention, a coextrusion molding method is preferred wherein the laminate is produced by coextrusion molding. However, the method for the production is not limited thereto, and it may be produced by various methods such as a heat fusion method wherein films, sheets or tubes made of materials forming the respective layers are laminated and pressed for heat fusion.

Figure 1:
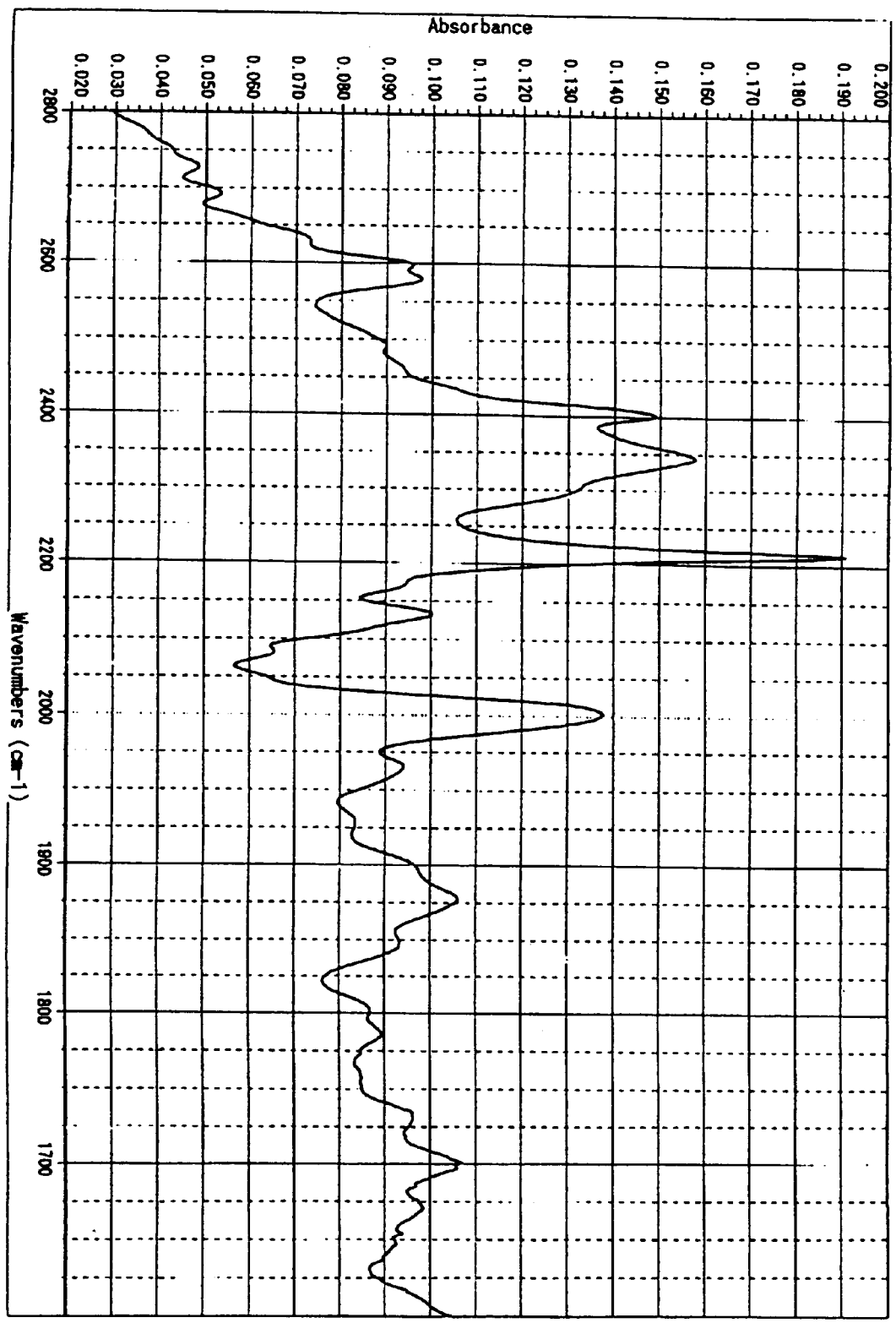
FIG. 1 shows the infrared absorption spectrum of the resin of pellets 2 obtained in Preparation Example 2.

Now, the present invention will be described in further detail with reference to Examples. However, it should be understood that the present invention is by no means restricted to such specific Examples. In the Examples, "parts" means "parts by weight". Further, the infrared absorption characteristics of the resins in Preparation Examples, were measured by means of films having a thickness of 100 μm formed from pellets produced in the Preparation Examples.

Preparation Example 1

Into a 100 l reactor, a mixed medium comprising 27 kg of water and 42 kg of perfluorocyclohexane, 5.5 kg of TFE, 0.2 kg of ethylene, 0.5 kg of (perfluorobutyl)ethylene and 0.5 kg of acetone as a chain transfer agent, were charged, and the temperature was raised to 65° C. Then, 300 ml of a perfluorohexane solution containing 10 wt % of t-butyl peroxyisobutyrate as a polymerization initiator, was added thereto to initiate suspension polymerization. During the polymerization, a mixed gas of TFE/ethylene (molar ratio: 60/40) was supplied to maintain the pressure constant. When the supplied amount of the mixed gas reached 8 kg, the polymerization was terminated.

The slurry was subjected to filtration and drying to obtain polymer A having a molar ratio of polymer units derived from ethylene/polymer units derived from TFE/polymer units derived from (perfluorobutyl)ethylene=58/39/3. Then, polymer A was pelletized by means of a single screw extruder at a temperature of 270° C. for a retention time of 3 minutes to obtain pellets 1. MFR of the resin of pellets 1 was 72. Further, no absorption peak was observed at a wavenumber of from 1,720 to 1,800 cm$^{-1}$.

Preparation Example 2

Polymer B was prepared in the same manner as in Preparation Example 1 except that the amount of acetone as the chain transfer agent was changed to 0.2 kg. Polymer B had a molar ratio of polymer units derived from ethylene/polymer units derived from TFE/polymer units derived from (perfluorobutyl)ethylene=58.5/39.0/2.5. Then, polymer B was pelletized by means of a single screw extruder at a temperature of 265° C. for a retention time of 2 minutes to obtain pellets 2. MFR of the resin of pellets 2 was 26. Further, no absorption peak was observed at a wavenumber of from 1,720 to 1,800 cm$^{-1}$. FIG. 1 shows infrared absorption spectrum of the resin.

Preparation Example 3

Figure 2:
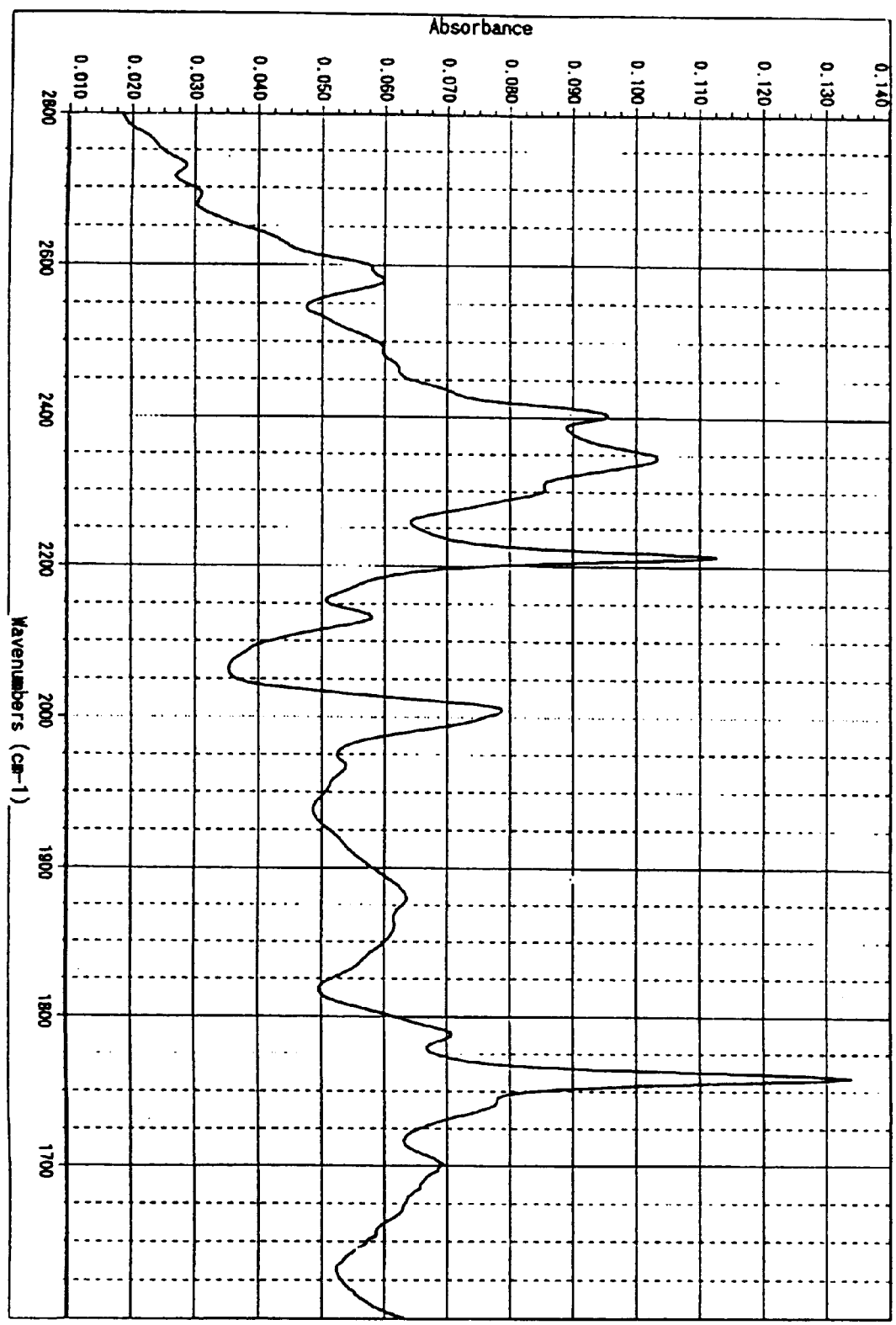
FIG. 2 shows the infrared absorption spectrum of the resin of pellets 3 obtained in Preparation Example 3.

100 Parts of pellets 2 were subjected to heat treatment in an oven of 350° C. for 60 minutes. Then, the heat treated product was pelletized by means of a single screw extruder at a temperature of 270° C. for a retention time of 3 minutes to obtain pellets 3. MFR of the resin of pellets 3 was 83. Further, absorbance of 0.058 was observed at a wavenumber of 1,759 cm$^{-1}$, and absorbance of 0.008 was observed at 1,788 cm$^{-1}$. FIG. 2 shows the infrared absorption spectrum of the resin.

Preparation Example 4

Figure 3:
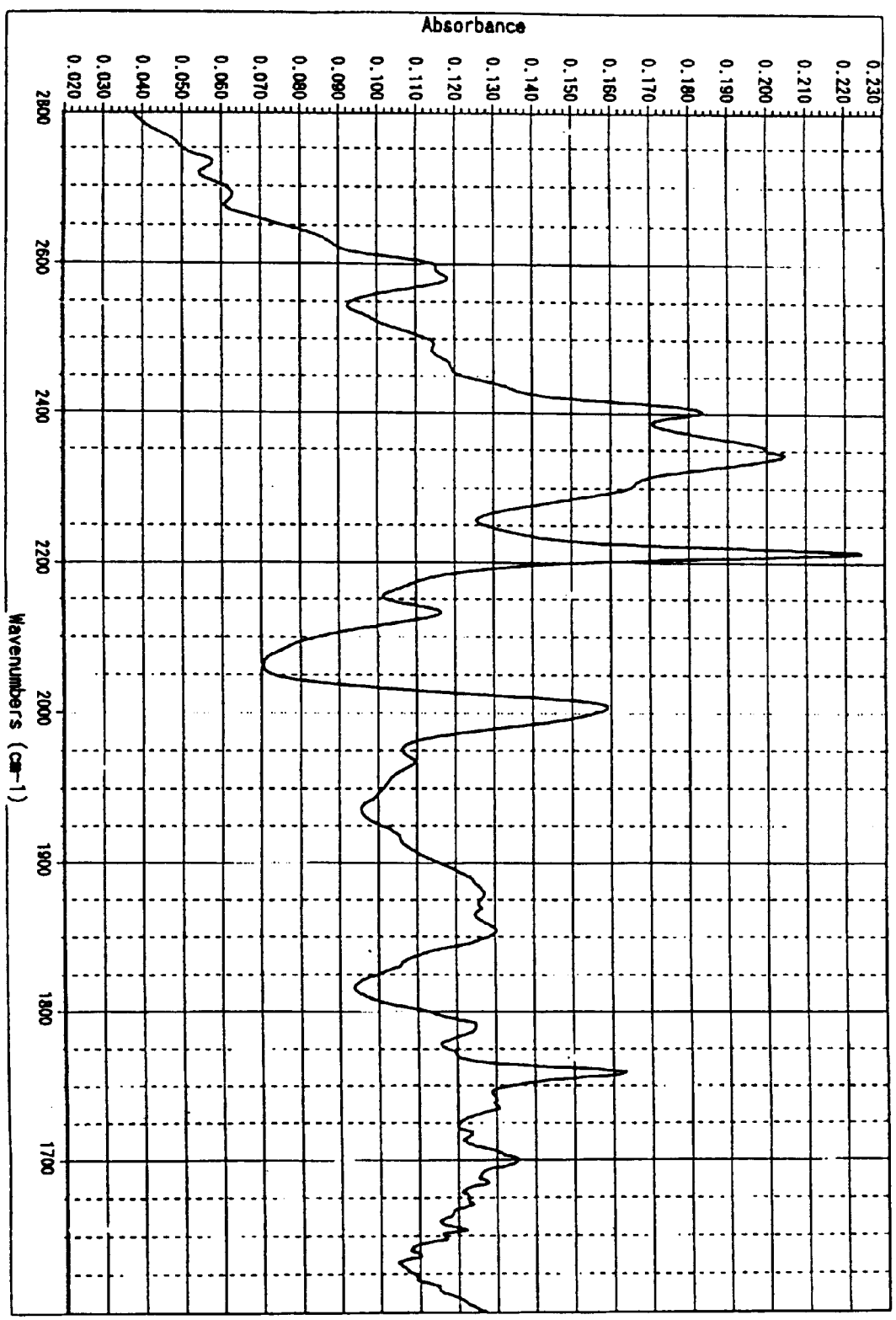
FIG. 3 is the infrared absorption spectrum of the resin of pellets 4 obtained in Preparation Example 4.

A mixture comprising 100 parts of pellets 2 and 0.2 part of t-butyl hydroperoxide, was pelletized by melt kneading by means of a twin screw extruder at a temperature of 310° C. for a retention time of 5 minutes to obtain pellets 4. MFR of the resin of pellets 4 was 64, and absorbance of 0.040 was observed at 1,759 cm$^{-1}$, and absorbance of 0.016 was observed at 1,788 cm$^{-1}$. FIG. 3 shows the infrared absorption spectrum of the resin.

Preparation Example 5

100 Parts of pellets 2 and 20 parts of carbon black as a conductive additive (Denka Black, manufactured by Denki Kagaku Kogyo K.K.) were preliminarily mixed and pelletized by melt-kneading by means of a twin screw extruder at a temperature of 270° C. for a retention time of 3 minutes to obtain pellets 5. The volume resistivity of the resin of pellets 5 was 2.1×10$^3$ Ωcm. Further, MFR of the resin obtained by melt-kneading pellets 2 under the above conditions without mixing carbon black, was 26, and no absorption peak was observed at a wavenumber of from 1,720 to 1,800 cm$^{-1}$.

Preparation Example 6

A granulated powder (average particle size: 1 to 2 mm) of polymer B was subjected to corona discharge treatment in air with an output of 1.2 kW and then pelletized by means of a single screw extruder at a temperature of 260° C. for a retention time of 2 minutes to obtain pellets 6. MFR of the resin of pellets 6 was 24, and absorbance of 0.035 was observed at 1,759 cm$^{-1}$, and absorbance of 0.004 was observed at 1,788 cm$^{-1}$.

Preparation Example 7

100 Parts of pellets 1 and 20 parts of carbon black as a conductive additive (Denka Black, manufactured by Denki Kagaku Kogyo K.K.) were preliminarily mixed and pelletized by melt-kneading by means of a twin screw extruder at a temperature of 350° C. for a retention time of 3 minutes to obtain pellets 7. The volume resistivity of the resin of pellets 7 was 1.6×10$^2$ Ωcm. Further, MFR of the resin obtained by melt-kneading pellets 1 under the above conditions without mixing carbon black, was 52, and absorbance of 0.039 was observed at 1,759 cm$^{-1}$, and absorbance of 0.005 was observed at 1,788 cm$^{-1}$.

EXAMPLE 1

A laminated tube having a three layer structure was produced by means of a coextrusion molding machine. Pellets 1 were supplied to a cylinder for forming an interlayer of the tube and transported to a transport zone of the cylinder after a retention time of 3 minutes in a melting zone of the cylinder at a temperature of 270° C. Pellets of polyamide 12 (L-2121, manufactured by Daicel Huls K.K.) (hereinafter referred to as pellets 8) were supplied to a cylinder for forming an outer layer of the tube. Further, pellets 5 were supplied to a cylinder for forming an inner layer. By setting the temperatures of the transport zones of the cylinders for pellets 8 and pellets 5 to be 240° C. and 270° C., respectively, the retention times to be 2 minutes and 3 minutes, respectively, and the temperatures of coextrusion die to be 260° C., a laminated tube of a three layer structure comprising an outer layer made of the material of pellets 8, an interlayer made of the material of pellets 1 and an inner layer made of the material of pellets 5, was molded.

The outer diameter of the laminated tube was 8 mm, the inner diameter was 6 mm, and the thicknesses of the outer layer, the interlayer and the inner layer were 0.75 mm, 0.15 mm and 0.10 mm, respectively. Further, the peel strength between the outer layer and the interlayer was 7.2 kg/cm, and the volume resistivity of the conductive layer of the inner layer was $3.2 \times 10^2$ Ωcm. Further, the obtained tube was immersed in a fuel oil (fuel oil C in accordance with JIS K6301 (isooctane/toluene=50/50 (volume ratio)), the same applies hereinafter) at 60° C. for 240 hours, and thereafter, the peel strength between the outer layer and the interlayer was measured and found to be 5.8 kg/cm, and no peeling was possible at the interface between the inner layer and the interlayer. Thus, this laminated tube had properties suitable particularly as a laminated tube for transporting a liquid fuel.

EXAMPLE 2

A laminated film having a double layer structure was produced by means of a coextrusion molding machine in the same manner as in Example 1. Pellets 3 were supplied to a cylinder for forming a first layer of the film, and pellets of polyamide 11 (RILSAN AESN 20 TL, manufactured by Toray Corporation) (hereinafter referred to as pellets 9) were supplied to a cylinder for forming the other layer. The temperatures at the transport zones of the cylinders for pellets 3 and pellets 9 were 265° C. and 240° C., respectively, the retention times were 2 minutes and 3 minutes, respectively, and the temperature of the coextrusion die was 255° C. By this molding, a laminated film comprising a layer made of the material of pellets 9 and a layer made of the material of pellets 3, was obtained. The thickness of the layer made of the material of pellets 9 was 0.60 mm and the thickness of the layer made of the material of pellets 3 was 0.10 mm. The interlaminar peel strength was 6.1 kg/cm.

EXAMPLE 3

A laminated tube of a three layer structure was produced by means of a coextrusion molding machine in the same manner as in Example 1. Pellets 4 were supplied to a cylinder for forming an interlayer of the tube and transported to a transport zone of the cylinder after a retention time of 3 minutes in a melting zone of the cylinder at 270° C. Pellets of polyamide 12 (L-2140, manufactured by Daicel Huls K.K.) (hereinafter referred to as pellets 10) were supplied to a cylinder for forming an outer layer of the tube. Further, pellets 5 were supplied to a cylinder for forming an inner layer. By setting the temperatures at the transport zones of the cylinders for pellets 10 and pellets 5 to be 240° C. and 270° C., respectively, the retention times to be 2 minutes and 3 minutes, respectively, and the temperature of coextrusion die to be 260° C., a laminated tube of a three layer structure was molded. This tube comprised an outer layer made of the material of pellets 10, an interlayer made of the material of pellets 4, and an inner layer made of the material of pellets 5.

The outer diameter of the laminated tube was 8 mm, the inner diameter was 6 mm, and the thicknesses of the outer layer, the interlayer and the inner layer were 0.75 mm, 0.15 mm and 0.10 mm, respectively. The peel strength between the outer layer and the interlayer was 7.2 kg/cm, and the volume resistivity of the conductive layer of the inner layer was $3.2 \times 10^2$ Ωcm. Further, the obtained laminated tube was immersed in a fuel oil at 60° C. for 240 hours, and thereafter, the peel strength between the outer layer and the interlayer was measured and found to be 5.8 kg/cm, and no peeling was possible at the interface between the inner layer and the interlayer. Thus, this laminated tube had properties suitable particularly as a laminated tube for transporting a liquid fuel.

EXAMPLE 4

A laminated film of a double layer structure was produced by means of a coextrusion molding machine in the same manner as in Example 2. Pellets 6 were supplied to a cylinder for forming a first layer of the film, and pellets of polyamide 6 (BM1042, manufactured by Toray Corporation) (hereinafter referred to as pellets 11) were supplied to a cylinder for forming the other layer. By setting the temperatures at the transport zones of the cylinders for pellets 6 and pellets 11 to be 265° C. and 260° C., respectively, the retention times to be 2.5 minutes and 3 minutes, respectively, and the coextrusion die temperature to be 260° C., a laminated film comprising a layer made of the material of pellets 11 and a layer made of the material of pellets 6, was molded. The thickness of the layer made of the material of pellets 11 was 0.80 mm, and the thickness of the layer made of the material of pellets 6 was 0.20 mm, and the interlaminar peel strength was 2.9 kg/cm.

EXAMPLE 5

A laminated tube of a double layer structure was produced by means of a coextrusion molding machine in the same manner as in Example 1. Pellets 7 were supplied to a cylinder for forming an inner layer of the tube, and pellets 8 were supplied to a cylinder for forming an outer layer. By setting the temperatures at the transport zones of the cylinders for pellets 7 and pellets 8 to be 280° C. and 240° C., respectively, the retention times to be 3 minutes and 2 minutes, respectively, and the temperature of the coextrusion die to be 260° C., a laminated tube of a double layer structure comprising an inner layer made of the material of pellets 7 and an outer layer made of the material of pellets 8, was molded.

The outer diameter of the laminated tube was 8 mm, the inner diameter was 6 mm, and the thicknesses of the outer layer and the inner layer were 0.80 mm and 0.20 mm, respectively. The peel strength between the outer layer and the inner layer was 4.8 kg/cm, and the volume resistivity of the conductive layer of the inner layer was $8.5 \times 10^3$ Ωcm. Further, the obtained tube was immersed in a fuel oil at 60° C. for 720 hours, and thereafter, the peel strength between the outer layer and the inner layer was measured and found to be 4.6 kg/cm. Thus, this laminated tube had properties particularly suitable as a laminated tube for transporting a liquid fuel.

EXAMPLE 6

Comparative Example

A laminated tube of a three layer structure was produced by means of a coextrusion molding machine in the same manner as in Example 1. Pellets 2 were supplied to a cylinder for forming an interlayer of the tube and transported to the transport zone of the cylinder after a retention time of 3 minutes at the melt zone temperature of the cylinder being 270° C. Pellets 8 were supplied to a cylinder for forming an outer layer of the tube. Further, pellets 5 were supplied to a cylinder for forming an inner layer. By setting the temperatures at the transport zones of the cylinders for pellets 8 and pellets 5 to be 240° C. and 270° C., respectively, the retention times to be 2 minutes and 3 minutes, respectively, and the temperature of the coextrusion die to be 260° C., a laminated tube of a three layer structure, was molded. This tube comprised an outer layer made of the material of pellets 8, an interlayer made of the material of pellets 2, and an inner layer made of the material of pellets 5.

The outer diameter of this laminated tube was 8 mm, the inner diameter was 6 mm, and the thicknesses of the outer layer, the interlayer and the inner layer were 0.75 mm, 0.15 mm and 0.10 mm, respectively. Further, the peel strength between the outer layer and the interlayer was not higher than 0.1 kg/cm$^2$, and the volume resistivity of the conductive layer of the inner layer was 3.4×10$^2$ Ωcm. Further, this laminated tube was immersed in a fuel oil at 60° C. for 240 hours, and thereafter, the peel strength between the outer layer and the interlayer was measured and found to be not higher than 0.1 kg/cm.

EXAMPLE 7

Comparative Example

A laminated film of a double layer structure was produced by means of a coextrusion molding machine in the same manner as in Example 1. Pellets 2 were supplied to a cylinder for forming a first layer of the film, and pellets 10 were supplied to a cylinder for forming the other layer. By setting the temperatures at the transport zones of the cylinders for pellets 2 and pellets 10 to be 265° C. and 260° C., respectively, the retention times to be 2.5 minutes and 3 minutes, respectively, and the temperature of the coextrusion die to be 260° C., a laminated film comprising a layer made of the material of pellets 2 and a layer made of the material of pellets 10, was prepared. The thickness of the layer made of the material of pellets 10 was 0.75 mm, and the thickness of the layer made of the material of pellets 2 was 0.25 mm. The interlaminar peel strength was not higher than 0.1 kg/cm.

As described in the foregoing, a layer of a fluororesin (A) comprising ETFE having a melt flow characteristic of MFR being at least 40 and/or the infrared absorption characteristic, is capable of firmly bonding to a layer of a thermoplastic resin (B) such as a polyamide resin and capable of maintaining its high bond strength even when contacted with a liquid fuel. A laminate having a layer of such fluororesin (A) and a layer of a thermoplastic resin (B), or a laminate having at least three layer structure having an ETFE layer further formed on the fluororesin (A) layer side, has properties suitable as a tube for transporting a liquid fuel such as gasoline, by virtue of the high interlaminar bond strength and the property not to permit penetration of a liquid fuel which is specific to ETFE. Further, in such use, the surface layer which is in contact with a liquid fuel may be made to be a conductive layer to present an antistatic property.

What is claimed is:

1. An adhesive fluororesin (A) comprising an ethylene-tetrafluoroethylene copolymer having at least one characteristic selected from the group consisting of a melt flow characteristic which is a melt flow rate of at least 40 and an infrared absorption characteristic which is a distinct absorption peak within a wavenumber range of from 1,720 to 1,800 cm$^{-1}$ in its infrared absorption spectrum.

2. The adhesive fluororesin (A) according to claim 1, which comprises an ethylene-tetrafluoroethylene copolymer having a melt flow characteristic which is a melt flow rate of at least 40 and an infrared absorption characteristic which is a distinct absorption peak within a wavenumber range of from 1,720 to 1,800 cm$^{-1}$ in its infrared absorption spectrum.

3. A laminate comprising a layer of the fluororesin (A) as defined in claim 2 and a layer of a thermoplastic resin (B) other than the fluororesin (A), said layers being in contact directly with each other.

4. The laminate according to claim 3, wherein the thermoplastic resin (B) is a polyamide resin.

5. The laminate according to claim 3, wherein on at least one of the fluororesin (A) layer side and the thermoplastic resin (B) layer side, a layer of a thermoplastic resin which is the same as or different from such resins, is present.

6. The laminate according to claim 5, wherein the layer of a thermoplastic resin present on the fluororesin (A) layer side is a layer of a fluororesin comprising an ethylene-tetrafluoroethylene copolymer which is the same as or different from the fluororesin (A).

7. The laminate according to claim 5, wherein the layer of a thermoplastic resin present on the fluororesin (A) layer side is a layer having electrical conductivity.

8. The laminate according to claim 7, wherein the layer having electrical conductivity is made of a material having a volume resistivity of from 1×10$^0$ to 1×10$^9$ Ωcm.

9. The laminate according to claim 3, wherein the layer of the fluororesin (A) is a layer having electrical conductivity.

10. The laminate according to claim 9, wherein the fluororesin (A) having electrical conductivity has a volume resistivity of from 1×10$^0$ to 1×10$^9$ Ωcm.

11. The laminate according to claim 3, wherein the laminate is a tubular laminate.

12. The laminate according to claim 11, wherein the tubular laminate is a tube for transporting a liquid fuel.

13. The laminate according to claim 3, wherein the laminate is a film laminate.

14. A laminate comprising a layer of the fluororesin (A) as defined in claim 1 and a layer of a thermoplastic resin (B) other than the fluororesin (A), said layers being in contact directly with each other.

15. A bonding method which comprises bonding a fluororesin other than the fluororesin (A) as defined in claim 1, to a substrate by means of the fluororesin (A) as an adhesive.

* * * * *